June 13, 1972   H. G. FALTIN   3,669,814
PRE-PRINTED INSERTS AND FEED MEANS THEREFOR
Filed Feb. 27, 1970   3 Sheets-Sheet 1
FIG. 1
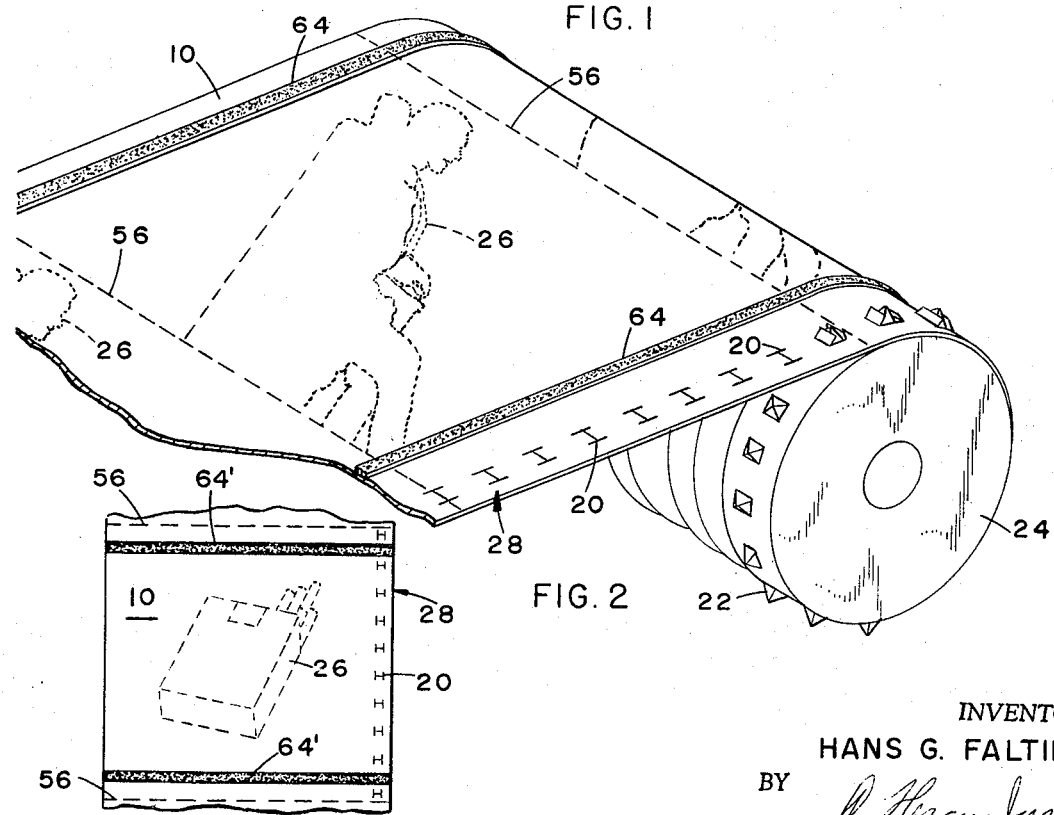
FIG. 2
FIG. 6
INVENTOR.
HANS G. FALTIN
BY
ATTORNEY June 13, 1972 H. G. FALTIN 3,669,814
PRE-PRINTED INSERTS AND FEED MEANS THEREFOR
Filed Feb. 27, 1970 3 Sheets-Sheet 2

INVENTOR.
HANS G. FALTIN
BY
ATTORNEY

June 13, 1972   H. G. FALTIN   3,669,814
PRE-PRINTED INSERTS AND FEED MEANS THEREFOR
Filed Feb. 27, 1970   3 Sheets-Sheet 3
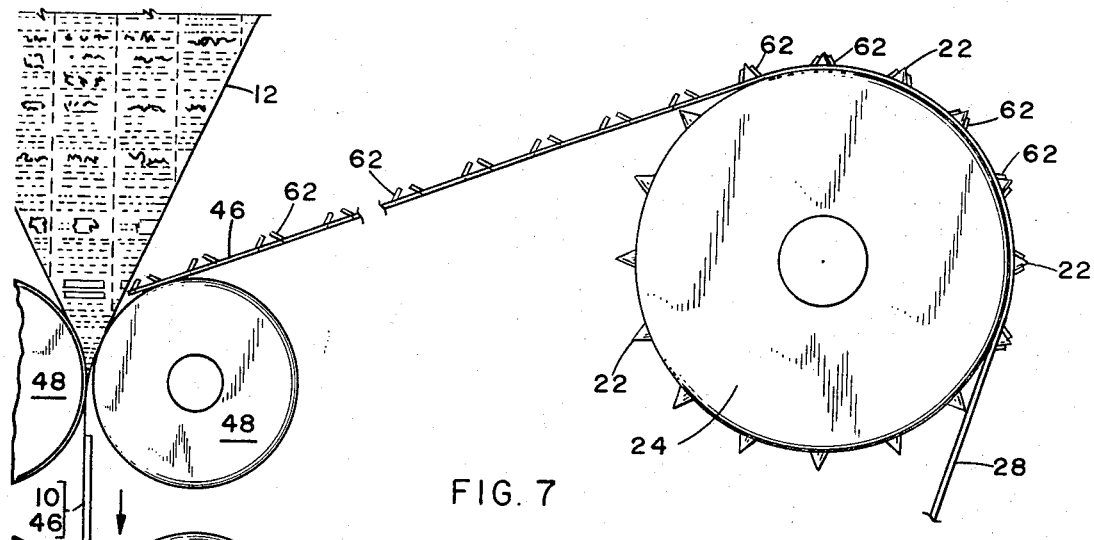
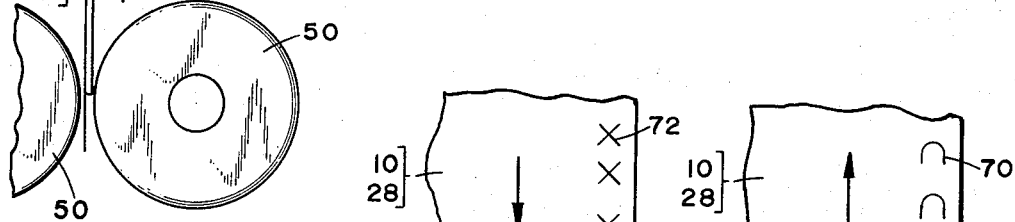
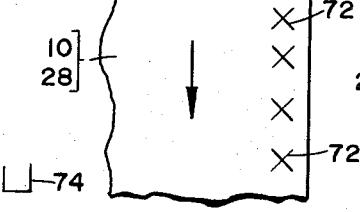
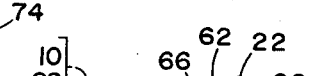
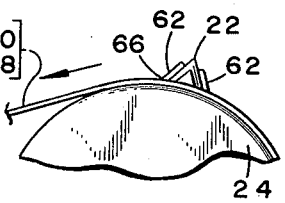
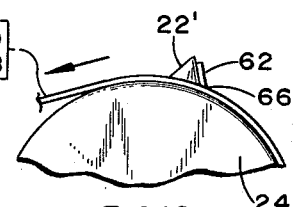
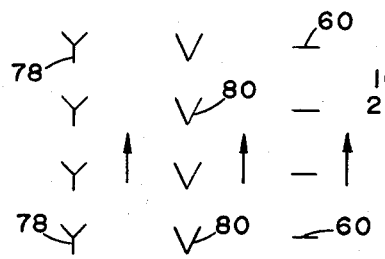
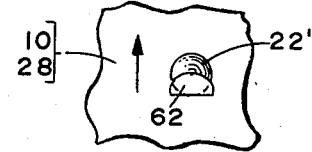
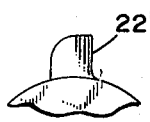
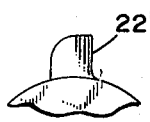
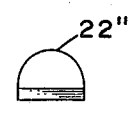
INVENTOR.
HANS G. FALTIN
BY
ATTORNEY

United States Patent Office 3,669,814
Patented June 13, 1972

3,669,814
PRE-PRINTED INSERTS AND FEED MEANS THEREFOR
Hans G. Faltin, York, Pa., assignor to Advance Enterprises, Inc., York, Pa.
Filed Feb. 27, 1970, Ser. No. 15,058
Int. Cl. B32b 3/10
U.S. Cl. 161—37
6 Claims

ABSTRACT OF THE DISCLOSURE

Inserts to be attached by adhesive to a carrying piece such as a rapidly moving printed web for newspapers, magazines, etc., the inserts being pre-printed and provided with feeding means comprising a plurality of self-closing or disappearing holes engageable by pin-type feed wheels of feeding mechanism and formed by incisions made in the strip of said inserts so as to form flaps which are temporarily bent from the plane of the inserts but which are restored to the plane upon affixing the inserts to the printed web.

CROSS REFERENCES TO RELATED APPLICATIONS

The present invention comprises an improvement adapting pre-printed inserts to rapidly moving printed webs and the like similar to the manner in which the products, comprising the subject matter of pending application, Ser. No. 778,428, filed Nov. 24, 1968, are attached to such web but in a manner which renders the feeding means less noticeable than in the subject matter of said co-pending application.

BACKGROUND OF THE INVENTION

The present invention has been made by one of the co-inventors of several inventions comprising the subject matter of prior Pat. No. 3,476,307, issued Nov. 4, 1969, and pending applications, Ser. Nos. 638,019, filed May 12, 1967 and now Pat. No. 3,504,833, issued Apr. 7, 1970, and 778,428, filed Nov. 25, 1968. In regard to the feeding means for the inserts comprising the subject matter of certain of the foregoing patent and applications, a row of evenly spaced perforations of substantial diameter are formed along one edge of a connected strip of such inserts. In addition to utilizing said type of feeding means for a strip of separable inserts which form foldable mailing pieces, it now has been found that there is an appreciable market for flat, sheet-type inserts having feeding means along one or more edges, for example. Without restriction thereto, such inserts may be printed on one or both sides in a single or multi-colors on paper of substantially higher quality than that normally used for items such as newsprint for newspapers, magazines, Sunday supplements and the like.

In order to enhance certain articles, advertisements and the like in newspaper or magazine publications for example, it has been found that such single or multi-colored printed inserts are very useful and desirable and demand for the same now is increasing. However, by using a series of completely punched perforated holes, for example, as feeding means along one or more edges of the inserts, said holes are quite noticeable when the inserts are affixed by stripes of adhesive or the like to the printed web and thus detract from the appearance of them. In order to obviate this objectionable feature in such inserts, the present invention has been devised which solves the problem effectively and inexpensively, details of which are described hereinafter.

SUMMARY OF THE INVENTION

It is the principal object of the present invention to provide a strip of readily detachable pre-printed inserts which each comprise pre-printed sheets of uniform size having images and/or texts printed on them, either on one or both sides thereof. The strip of insert sheets has feeding means along one or more edges which, essentially, comprise what may be appropriately described as self-closing or disappearing holes, the configuration of which may result from any one of a number of different types of incisions which may be either simple slits longitudinally spaced from each other in the direction of the feed of the strip of inserts, or said incisions may be of a number of different patterns resulting in the formation of flaps which may be temporarily flexed or bent from the plane of the inserts such as when a pin of a feed wheel is indexed relative to the incision and pushed therethrough incident to feeding the strip of inserts through a machine which not only feeds but separates the leading insert from the strip thereof and projects the same accurately in a path for attachment of the insert to a carrying piece such as a printed web or the like. A typical feeding and separating machine for such purpose comprises the subject matter of aforementioned application, Ser. No. 638,019.

Another object of the invention is to provide attaching areas either along one or both longitudinal sides of each insert or along transversely extending areas thereof, parallel to the severing lines between adjacent inserts, such attaching areas being adapted to receive adhesive of any of a number of different types and preferably incident to feeding the inserts through the feeding and separating machine in such manner that the adhesive is activated and adapted to adhere to the carrying piece by the time the inserts successively are projected onto the same in predetermined locations.

Details of the foregoing objects and of the invention, as well as other objects thereof, are set forth in the following specification and illustrated in the accompanying drawings comprising a part thereof.

DESCRIPTION OF THE DRAWINGS

FIG. 1 is a fragmentary plan view of an exemplary carrying piece to which a preprinted insert which embodies the principles of the present invention has been attached.

FIG. 2 is a fragmentary perspective view of a feed roll engaging a strip of severable inserts with feed means embodying the present invention.

FIG. 6 is a fragmentary view similar to FIG. 5 but illustrating another embodiment of the invention.

FIG. 7 is a fragmentary side elevation illustrating feeding means for inserts of the present invention and also showing the manner in which such inserts are attached to a printed web comprising a carrying piece.

FIG. 8 is a fragmentary view showing one edge of a portion of an insert which includes one embodiment of feed means according to the present invention.

FIG. 9 is a fragmentary side elevation illustrating the manner in which the feed means of the insert shown in FIG. 8 is engaged by a feeding pin of a feed wheel.

FIG. 10 is a fragmentary top plan view of the arrangement shown in FIG. 9.

FIGS. 11, 12 and 13 respectively corresponds to FIGS. 8, 9 and 10 but illustrate another embodiment of feed means on the inserts and feed wheel from that shown in the latter figures.

FIGS. 15 and 16 respectively are a fragmentary side elevation and plan view of a still further shape of feed pin which may be employed upon a feed wheel for the inserts.

FIGS. 17–22 respectively illustrate patterns of incisions comprising feed means which may be formed in the inserts in accordance with the principles of the present invention, each of said figures including an arrow indicating the direction in which it is preferred that the insert which embodies said patterns of incisions shall be moved in feeding direction.

DESCRIPTION OF THE PREFERRED EMBODIMENTS

Referring to FIG. 1, there is shown a typical example of the manner in which a pre-printed insert 10 which embodies the principles of the present invention is utilized by attaching the same to a carrying piece comprising a printed web 12. As illustrated, it will be seen that the printed web 12 may be a page of a newspaper and especially of a Sunday supplement, for example, wherein many advertisements are included of the type which readily could employ inserts embodying the present invention. Otherwise, the printed web 12 may be a page of a magazine or any other type of publication.

While the invention is not intended to be restricted to providing single or multi-colored inserts of high quality which are printed upon more expensive paper than is employed, for example, in the printing of newspapers and many types of magazines, the invention nevertheless is highly suitable to be adapted to the printing of inserts of either a single or a multi-colored nature upon paper of that quality which will appropriately justify the cost of multi-colored printing to produce an insert product of the type which will be aesthetic and eye-catching.

Figure 14:
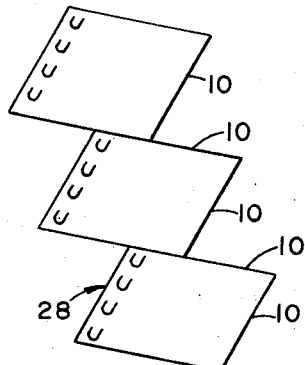
FIG. 14 shows an accordion fold-type arrangement of a series of severably connected pre-printed inserts embodying the principles of the present invention and illustrating one manner of compactly packaging and storing the same.
Figure 3:
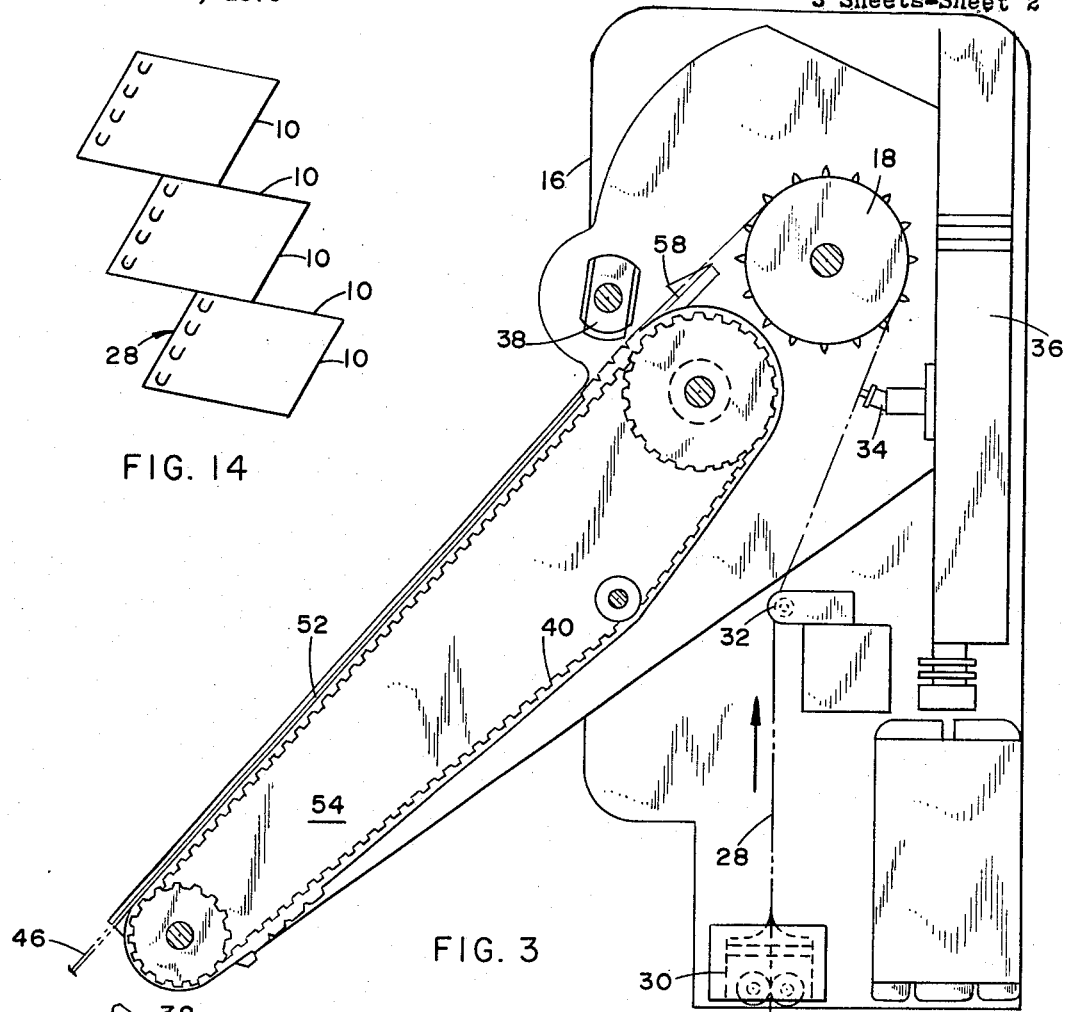
FIG. 3 is a side elevation of one type of feeding machine adapted to be employed with a strip of inserts embodying the principles of the present invention.

To achieve the benefits of the present invention, the pre-printed inserts are arranged either in accordion fashion, such as shown in exemplary manner, in perspective fashion, in FIG. 14, it being understood that the same will be compressed into flatly overlying arrangement in a stack of the same, or in a cylindrical coil of the same so that they readily may be fed to a separating and feeding machine 16 such as shown in FIG. 3 which, for example, comprises the subject matter of co-pending application, Ser. No. 638,019. Certain details of said machine are described hereinafter but for a further understanding of all details of the machine, attention is directed to said application. Essentially, the principal feature of the present invention is concerned with the attachment of pre-printed inserts 10 by means which will not detract from the attractive nature of the insert, and in this respect, the present invention differs from the feeding and attaching means on mailing pieces comprising the subject matter of the aforementioned pending applications and issued patent in which the present inventor is a co-inventor.

In brief, rather than provide the pre-printed inserts 10 with a row of punched holes or perforations comprising feeding means engageable by a pin-type feed wheel 18, for example, such as shown in FIG. 3, and otherwise illustrated in detail in said above-mentioned co-pending application, it is the principal purpose of the present invention to provide each insert with, preferably, a single row of feeding means comprising self-closing holes 20 and conform the pin-like feed members 22 of the pin-type feed wheel 24 thereto so as to be complementary therewith. To accomplish the desired results, preferably no material is removed from the inserts 10 when forming the self-closing holes 20 therein; rather, said self-closing type holes 20 are formed by incisions which, for example, may be made either prior to, subsequent to, or incident to printing the single or multi-colored image 26 thereon as shown in FIG. 1.

To fully appreciate the nature of the present invention, it is believed that at least a limited description of a typical type feeding and separating machine for the inserts, such as machine 16, is in order, notwithstanding the fact that full details thereof will be found in said co-pending application, Ser. No. 638,019. Accordingly, referring especially to FIG. 3, it will be seen that a strip 28 of inserts 10 are drawn by the pin-type feed wheel 18 through a unit 30 which imparts a limited amount of tension to the strip. Said strip passes over safety-type break-detecting unit 32 which is operable automatically and instantaneously to stop the operation of the machine 16 in the occurrence of a break in the strip 28 of inserts 10.

Adhesive type attaching means is applied to the inserts by nozzle unit 34 which applies continuous or interrupted type adhesive material in any one of a number of ways to the advancing strip 28, certain of which are described in detail in said co-pending application. Said adhesive preferably is of the heat-activatable type which is melted by unit 36, but it is to be understood that any other type of adhesive applying unit may be employed, including those which feed normally liquid but preferably rapid-drying liquid type adhesive. Details of the areas to which said adhesive may be applied to the pre-printed inserts are set forth hereinafter.

Figure 4:
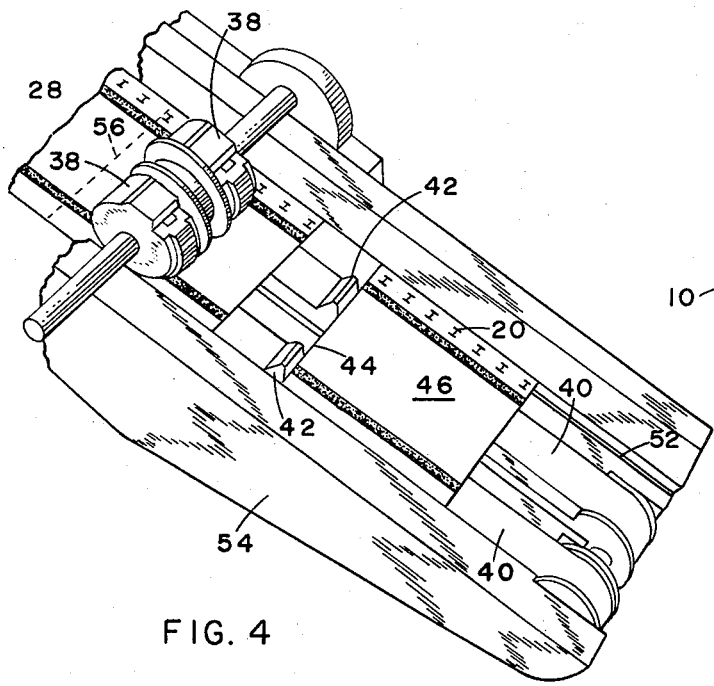
FIG. 4 is a perspective view of a portion of the strip feeding machine shown in FIG. 3 as seen from the upper portion of said machine and showing the manner in which the same feeds a severed insert.

The strip 28 of inserts 10 pass around the pin-type feed wheel 18, as shown in FIG. 3, and the leading insert of said strip is engaged by a jerk-producing unit primarily comprising rollers 38, details of which are best shown in FIGS. 3 and 4, which have a much higher surface speed than that of the feed wheel 18. Similarly, flexible feed belts 40, having pushing shoulders 42 thereon which project above the surface thereof so as to engage the trailing edge 44 of the endmost insert 46, such as shown in FIG. 4, positively insure feeding movement of the separated inserts at a very high rate of desired speed so as to discharge the separated inserts 46, as shown in FIG. 7, at a predetermined location upon the carrying piece such as printed web 12.

The deposit or positioning of the insert upon the web may occur at any desired location of the passage of said web in the printing press, or as illustrated in detail in FIG. 7, immediately prior to the web engaging the folding rollers 48 and also prior to the same being passed through the creasing rollers 50. By referring particularly to FIGS. 3 and 4, it will be seen that the opposite edges of the leading insert 46 which has been separated from the strip of severable inserts 10, are received within appropriate guide slots 52 which are provided at opposite sides of the conveyor unit 54, although only one of such slots is illustrated in FIG. 4 due to the perspective nature of the figure.

Figure 5:
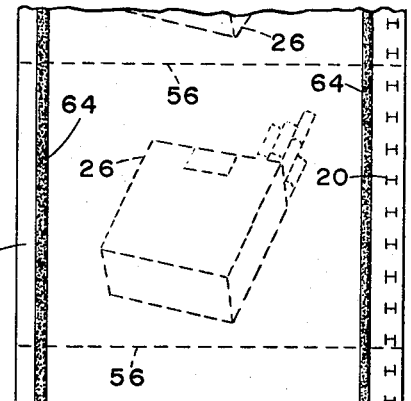
FIG. 5 is a fragmentary view of one embodiment of printed insert employing the principles of the present invention.

As described in greater detail in said co-pending application, Ser. No. 638,019, the leading insert 46 is separated by a jerking movement from the forward end of the infinitely connected series of inserts 10 due to the surface speed of the rollers 38 and feed belts 40 being substantially greater than the surface speed of the feed wheel 18. The inserts 10 are severably connected by rows of transverse perforations 56 which are best shown in FIGS. 2, 5 and 6. When said severable rows of perforations 56 between the leading insert 46 and the next adjacent insert moves past rupturing blade 58, see FIG. 3, the jerking movement imparted to the leading insert 46 by the rollers 38 and feed belts 40 will cause the transverse rows of perforations 56 to separate instantaneously, further details of which operation are set forth in said aforementioned pending application, Ser. No. 638,019.

As indicated above, the essential features of the present invention concern particularly the feed means on each preprinted insert 10 comprising what has been termed above self-closing holes 20. One form of said hole is illustrated in FIGS. 1, 2 and 4 through 6. Such illustration is intended to be illustrative only however inasmuch as numerous other patterns are illustrated for example in FIGS. 8 and 11 and 17–22, details of which are described hereinafter.

The self-closing or disappearing holes 20, in all embodiments illustrated herein, as well as others which are possible under the generic nature of those which are illustrated herein, are formed by incisions which preferably are made by sharp cutting instruments of the type which are conventionally used to form separating lines of various kinds in paper sheets and forms, both printed and otherwise. Said means frequently are applied to a printing press and the incisions are formed incident to the printing of certain items which embody such separating means.

It is immaterial to the present invention when the incisions are formed, that is, either before or after printing or incident thereto. The purpose of the invention is to form the incisions in such manner that the pattern which is incised, except for the simple slits 60 comprising the pattern of FIG. 22, will form tongues or flaps 62 which, as illustrated in somewhat enlarged detail in FIGS. 9 and 12 for example, will be bent upwardly from the plane of the individual inserts 10 or the strip 28 thereof a limited extent, in accordance with the complementary configuration of the pin-like feed members 22. In this regard, note in FIG. 2 for example that said pin-type feed members 22 may comprise square based pyramids which operate quite satisfactorily with respect to the H-shaped incisions shown in FIGS. 1, 2 and 4 through 6 which comprise the self-closing holes 20.

It also is to be noted that the flaps 62 project from the surface of the inserts 10 or strip 28 thereof upon which attaching means comprising, preferably, stripes of adhesive 64 are applied, said surface also being opposite that upon which the single or multi-colored image 26, for example, is printed, whereby said image in FIG. 2, for example, is shown in phantom inasmuch as it is on the reverse side from that upon which the stripes of adhesive 64 are applied. If desired, the surface of the insert to which the adhesive is applied also may contain text material and the like. Similarly, in FIG. 1, it is intended that the stripe of adhesive 64 is in phantom since it is on the reverse side from which the image 26 is printed and is in direct contact with the outer surface of the printed web 12 comprising the carrying piece to which the insert 10 is affixed.

It is preferred in accordance with all of the patterns of the individual incisions that either a transversely extending bend 66 be formed for abutment against the leading edge of the pin-like feed member 22 or that a curved surface of reasonable extent will be formed for engagement, for example, by a feed pin which is circular in cross-section such as the exemplary conical pin 22' shown in FIGS. 12 and 13 and particularly adapted to engage the pattern 68 shown in FIG. 17 for example. Incident to using such pattern of projecting pin 22', a somewhat U-shaped incision 70 is suitable such as that shown in example in FIG. 11. With the square pyramidal type of pin 22 shown in FIGS. 9 and 10, a substantially X-shaped incision 72 is appropriate and useful. Likewise, a very angular U-shape of incision 74 such as shown in FIG. 19 also may be employed in relation to the square pyramidal shaped projecting pins 22, details of which are best shown in FIG. 2. Also, the rounded type pin 22" shown in FIGS. 15 and 16, but having a flat side for clearance in leaving the hole or incision, may be used especially with the pattern of incision 70 of FIG. 11. Either the curved sides or flat sides of pins 22" may be used as the propelling surface, as desired, especially in relation to the contour of the opening defined by the incisions in the insert.

A somewhat triangular pyramidal shape of projecting pin is suitable for use with either the T-shaped pattern of incision 76 shown in FIG. 18 or the Y-shaped incision 78 shown in FIG. 20, as well as the V-shaped incision 80 shown in FIG. 21. All of said patterns of incisions will provide appropriate bearing surfaces at the bend of the tongue or tongues from the plane of the insert against which the foremost surface of the feed pins 22, 22' or 22" for example, may abut while advancing the strip of inserts 28 by the driving movement of the feed wheel 24. Such bend which is formed by two angularly related planes of material provides a structural configuration inherently possessing substantial strength to resist tearing of the material.

Even though the tongues of flaps 62 of the various configurations are somewhat bent from the plane of the advancing strip of inserts 28 or the individual inserts 10 after separation thereof from said strip, it can be appreciated from FIG. 7 in particular that the somewhat upwardly extending flaps 62, some of which are shown in exaggerated manner, will engage the outer surface of the printed web 12 and upon such engagement, the projecting tongues or any projecting portions thereof will be flattened instantly backwardly into the plane of the insert and incident to the insert being attached to the web 12 by the stripes of adhesive 64.

When such tongues or flaps are restored to the plane of the inserts, due particularly to the fact that the self-closing holes 20 actually are formed solely by slits in the sheet material of the inserts, which are made by very thin sharp knives and no material is removed, not only will said holes be closed but they will be substantially imperceptible. That is the principal object of the present invention, namely, to provide feeding means on the inserts 10 but render the same inconspicuous after the insert has been attached to the carrying piece therefor and thus not detract from the attractive nature of the illustration on the insert which, under many circumstances, will be multi-colored and may be printed on more expensive paper than that comprising the carrying piece.

Although a limited number of patterns of incisions performing the self-closing holes 20 are shown in the drawings, it is to be understood that these are merely to be representative or illustrative rather than restrictive since other patterns are conceivable within the spirit of the invention. Further in accordance with the spirit of the invention, while it is presently conceivable that arranging the feed means on the inserts 10 so as to extend along one or two side edges thereof which are parallel to the longitudinal axis of the strip 28 of inserts is preferable, it also is conceivable that said feed means might be arranged transversely to the longitudinal axis of the strip 28 of inserts 10, such as adjacent the rows of transverse perforations 56 which detachably connect the inserts together.

Still further in accordance with the present invention, while the stripes of adhesive connecting means 64 are illustrated in certain figures as extending longitudinally of the inserts, in a direction parallel to the longitudinal axis of the strips 28 thereof, it is to be understood that the stripes of attaching means comprising adhesive 64', such as shown in FIG. 6, may be applied transversely of said strip of inserts 28 by appropriate applying means, not shown, but known in the trade as cross-web glue feeding mechanism. Still further, while under many circumstances, a single strip 64 of adhesive means will be sufficient to connect each insert to a carrying piece, under other circumstances, where desired, pairs of such stripes 64 of adhesive attaching means may be employed respectively adjacent opposite side edges of the inserts, and preferably parallel to each other.

From the foregoing, it will be seen that the present invention provides feeding means which essentially comprise self-closing holes which are engageable by pin-type feed means on a feed wheel for example, whereby tongues or flaps 62 are momentarily bent from the plane of the inserts incident to being fed to the carrying piece. The attachment of the inserts to the carrying piece flattens any upwardly bent or extending portions of the flaps into the plane of the insert and thus renders the self-closing holes 20 substantially inconspicuous due to the nature of the incision which forms the tongues or flaps which, when bent from the plane of the inserts, comprise the self-closing feed holes. Further, while the row of feed means comprising such self-closing holes are illustrated preferably as extending along one side edge of the inserts or transversely to the same, such as along one of the severed edges of the insert, it is further to be understood that, if desired, similar rows of self-closing holes may be formed at longitudinally spaced intervals transversely between the opposite edges of the inserts, or two rows thereof may be applied respectively adjacent the opposite side edges of the inserts, as desired.

While the invention has been described and illustrated in its several preferred embodiments, it should be understood that the invention is not to be limited to the precise details herein illustrated and described since the same may be carried out in other ways falling within the scope of the invention as illustrated and described.

What is claimed is:

1. Pre-printed inserts adapted to be fed at high speed for attachment to carrying pieces such as newspapers and magazines and comprising a strip of indefinite length of similar insert sheets of material each pre-printed on one surface and connected in end-to-end relationship, said strip of sheets having transversely extending rows of severable means between successive sheets to permit ready separation thereof from each other, feeding means on said sheets comprising a row of incisions similar to each other extending longitudinally along said sheets at a different location thereon from said rows of severable means, said incisions each forming at least one flap adapted to be bent upwardly temporarily from the plane of the sheet to provide a self-closing opening in which a feed prong is adapted to be projected momentarily during feeding of said sheets to carrying pieces and said flap of each opening then being adapted to be bent backward to close said openings, and areas of adhesive applied to said sheets along the surfaces thereof which are opposite said pre-printed surfaces.

2. The inserts according to claim 1 in which said adhesive areas extend longitudinally along said sheets adjacent one edge of each sheet.

3. The inserts according to claim 1 in which said adhesive areas comprises pairs of rows of adhesive applied respectively to said sheets adjacent opposite edges thereof.

4. The inserts according to claim 1 in which said adhesive areas extend along said sheets adjacent one edge substantially parallel to said row of feeding means.

5. The inserts according to claim 1 in which said adhesive areas extend along said sheets adjacent and parallel to one severed edge of said sheets when said sheets have been severed from said strip of sheets.

6. The inserts according to claim 1 in which said incisions form flaps adapted to be bent from the plane of the sheets along a line of bend transverse to the row of said feed means.

References Cited
UNITED STATES PATENTS

| | | | |
|---|---|---|---|
| 2,620,205 | 12/1952 | Vogt | 281—5 |
| 2,259,358 | 10/1941 | Templeton | 282—20 |
| 2,249,424 | 7/1941 | Hanington | 161—51 |
| 3,476,307 | 11/1969 | Faltin et al. | 229—69 |

PHILIP DIER, Primary Examiner

U.S. Cl. X.R.

161—110, 147; 229—69; 281—5; 282—20